(12) United States Patent
Scoda

(10) Patent No.: US 8,650,474 B2
(45) Date of Patent: Feb. 11, 2014

(54) METHODS FOR WEB CONTENT OPTIMIZATION IN SINGLE PAGE DISPLAY ENVIRONMENTS AND SYSTEMS THEREOF

(75) Inventor: Enrico Scoda, Martignacco (IT)

(73) Assignee: Usablenet Inc., New York, NY (US)

( * ) Notice: Subject to any disclaimer, the term of this patent is extended or adjusted under 35 U.S.C. 154(b) by 811 days.

(21) Appl. No.: 12/072,987

(22) Filed: Feb. 29, 2008

(65) Prior Publication Data

US 2009/0222475 A1 Sep. 3, 2009

(51) Int. Cl.
*G06F 17/27* (2006.01)
(52) U.S. Cl.
USPC .......................................................... 715/224
(58) Field of Classification Search
USPC .......................................................... 715/224
See application file for complete search history.

(56) References Cited

U.S. PATENT DOCUMENTS

| | | | |
|---|---|---|---|
| 2002/0194611 A1* | 12/2002 | Hodgkinson | 725/109 |
| 2003/0233425 A1* | 12/2003 | Lyons et al. | 709/217 |
| 2004/0142720 A1 | 7/2004 | Smethers | |
| 2005/0091072 A1 | 4/2005 | Dunn et al. | |
| 2005/0172261 A1* | 8/2005 | Yuknewicz et al. | 717/106 |
| 2005/0198564 A1 | 9/2005 | Sinzig et al. | |
| 2005/0278652 A1* | 12/2005 | Scholz | 715/780 |

* cited by examiner

*Primary Examiner* — Doug Hutton, Jr.
*Assistant Examiner* — Tionna Smith
(74) *Attorney, Agent, or Firm* — LeClairRyan, a Professional Corporation

(57) ABSTRACT

A method, computer readable medium and system for web content optimization in single page display environment includes receiving in a system with a single page display environment an engagement of an activator for a data picker for at least one form field in a form page. The form page is replaced with a data picker web page associated with the engaged activator in the single page display environment. A selection for the at least one form field from the data picker web page is received. The data picker web page is replaced with the form page in the single page display environment. The form page is filled with any previously entered data and the at least one form field with the received selection.

15 Claims, 7 Drawing Sheets

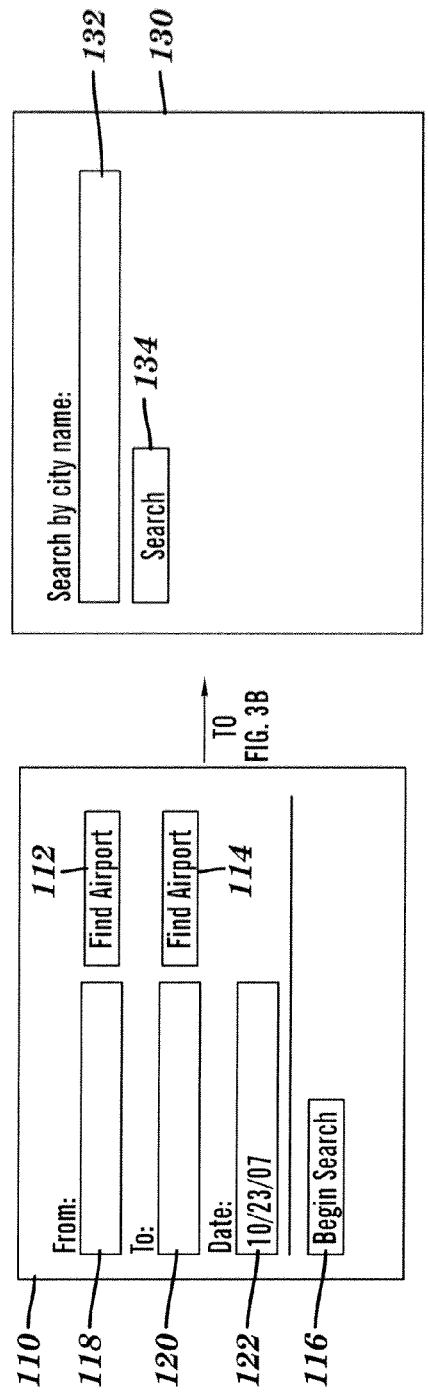
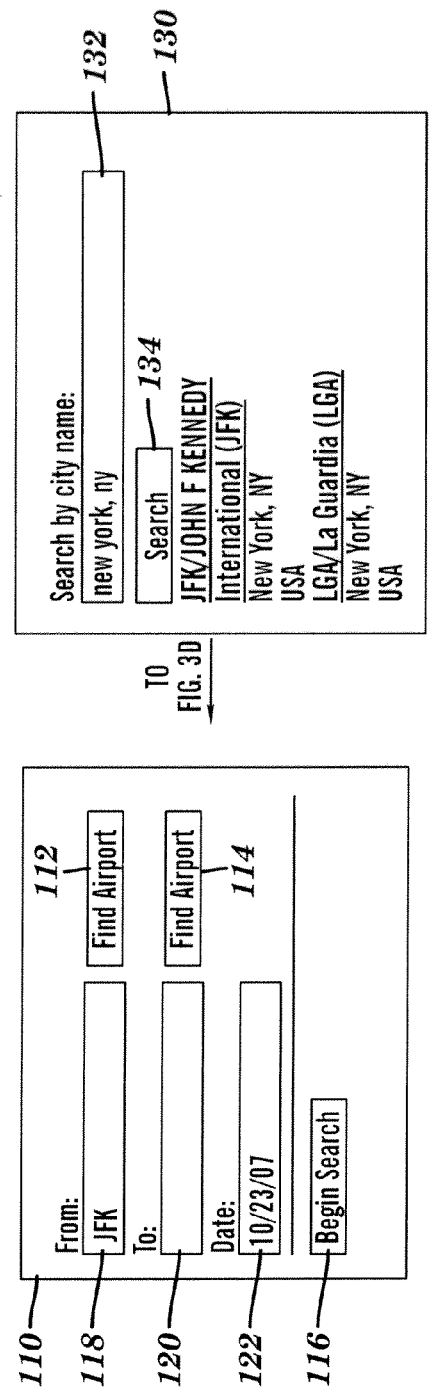
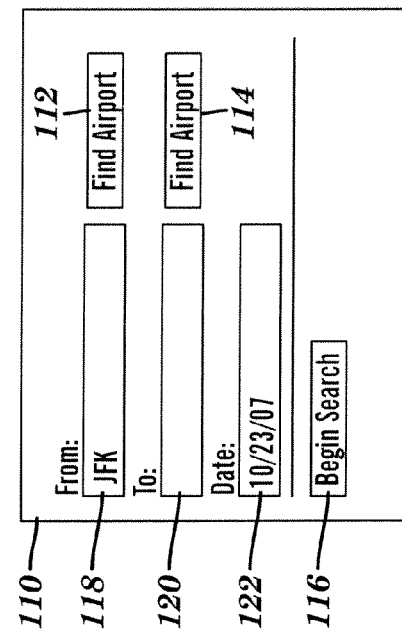
FIG. 3A
FIG. 3B
FIG. 3C
FIG. 3D

METHODS FOR WEB CONTENT OPTIMIZATION IN SINGLE PAGE DISPLAY ENVIRONMENTS AND SYSTEMS THEREOF

FIELD OF THE INVENTION

The present invention relates to a methods and systems for web content optimization and, more particularly, to methods for web content optimization in single page display environments and systems thereof.

BACKGROUND

Many web sites, such as air, train, or car booking sites, use popup windows or data pickers to enhance the web page interface and make selection of data such as dates or locations, easier for the user.

Referring to FIGS. 1A-1D, an example of a popup window 32 used to find and select airport codes in a web page window 10 for booking a flight on a given date is illustrated. As shown in FIG. 1A, the original web page window 10 includes a "From" field 20 to specify the departure location of the flight, a "To" field 22 to specify the arrival destination of the flight, and a "Date" field 24 to specify the departure date of the flight. Additionally, "Find Airport" buttons 26 and 28 are located adjacent "From" field 20 and "To" field 22, respectively, and a "Begin Search" button 30 is located on web page window 10 as well. If a user does not know the code of the departure or arrival airport, the user can press the corresponding one of the "Find Airport" buttons 26 and 28 to search for the airport code.

As shown in FIG. 1B, if either of the "Find Airport" buttons 26 and 28 is engaged, a new popup window 32 with a "Search by city name" field 34 and a "Search" button 36 appears. The user can type in the name of the city in the "Search by city name" field 34 and press the "Search" button 36 to get one or more codes of airport near the entered city, such as "JFK/John F Kennedy International (JFK)" text field 38 and a "LGA/La Guardia (LGA)" text field 40, as shown in FIG. 1C.

When the "JFK/John F Kennedy International (JFK)" text field 38 in the popup window 32 is selected, the code is copied in the "From" field 20 as shown in FIG. 1D and the popup window 32 is closed. These operations of opening the popup window and copying the result value to the original field can only be performed by script enabled web browsers that can open more than one web page at the same time.

Unfortunately, many devices, such as most mobile phones, smart phones, and personal digital assistants (PDAs), do not allow popup windows to be opened because their screen size is too small. Additionally, some desktop web browsers are configured to block popup windows. Further, the scripting capabilities of these devices are often very limited resulting in need for alternative solutions.

SUMMARY

A method for web content optimization in single page display environment in accordance with embodiments of the present invention includes receiving in a system with a single page display environment an engagement of an activator for a data picker for at least one form field in a form page. The form page is replaced with a data picker web page associated with the engaged activator in the single page display environment. A selection for the at least one form field from the data picker web page is received. The data picker web page is replaced with the form page in the single page display environment. The form page is filled with any previously entered data and the at least one form field with the received selection.

A computer readable medium in accordance with other embodiments of the present invention includes having stored thereon instructions for web content optimization in single page display environment comprising machine executable code which when executed by at least one processor, causes the processor to perform steps comprising receiving in a system with a single page display environment an engagement of an activator for a data picker for at least one form field in a form page. The form page is replaced with a data picker web page associated with the engaged activator in the single page display environment. A selection for the at least one form field from the data picker web page is received. The data picker web page is replaced with the form page in the single page display environment. The form page is filled with any previously entered data and the at least one form field with the received selection.

A system with web content optimization in single page display environment in accordance with other embodiments of the present invention includes a display system with a single page display format and a web page processing system. The web processing system receives an engagement of an activator for a data picker for at least one form field in a form page on display on the display system. The web processing system replaces the form page with a data picker web page associated with the engaged activator and receives a selection for the at least one form field from the data picker web page. The web processing system replaces the data picker web page with the form page in the single page display environment and fills the form page with any previously entered data and the at least one form field with the received selection.

The present invention provides web optimization systems and methods which enable the functionality of popup data pickers inside web applications to be executed in display environments which only permit viewing one page at a time. With the present invention, a much larger number of web applications which require the functionality of one or more popup windows can be viewed and used in devices with single page display format, such as mobile phones, smart phones, and PDAs or in desktop web browsers or other systems configured to block popup windows.

BRIEF DESCRIPTION OF THE DRAWINGS

FIGS. 3A-3D are diagrams of a booking page window for an airline web application and a popup window to find and select an airport code in a single page display environment in accordance with embodiments of the present invention;

DETAILED DESCRIPTION

Figure 1A:
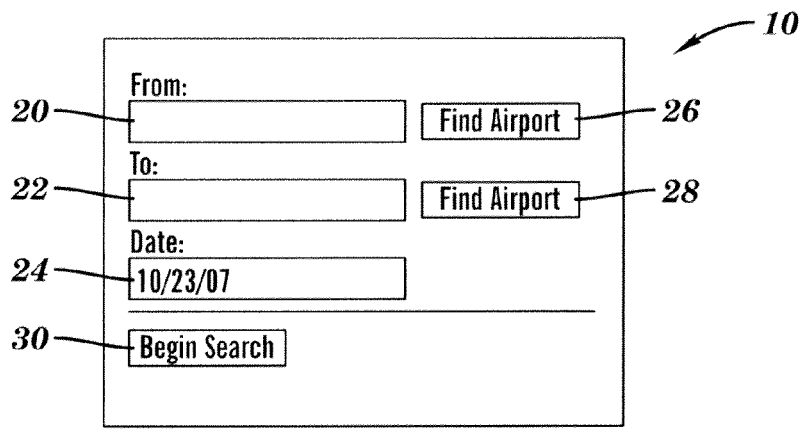
FIGS. 1A-1D are prior art diagrams of a booking page window for an airline web application with a popup window to find and select an airport code.
Figure 1B:
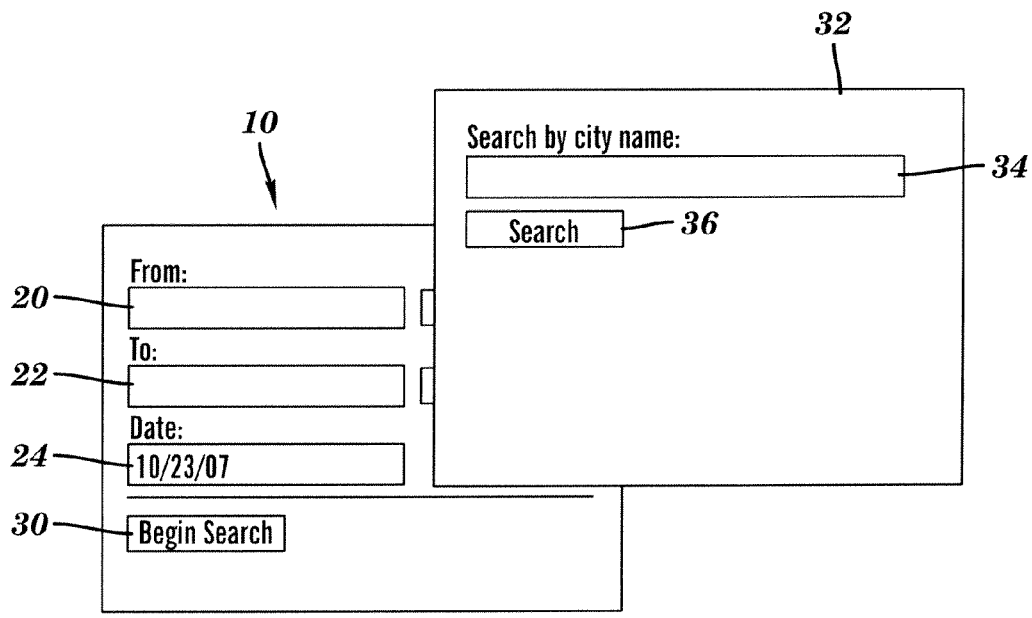
Figure 1C:
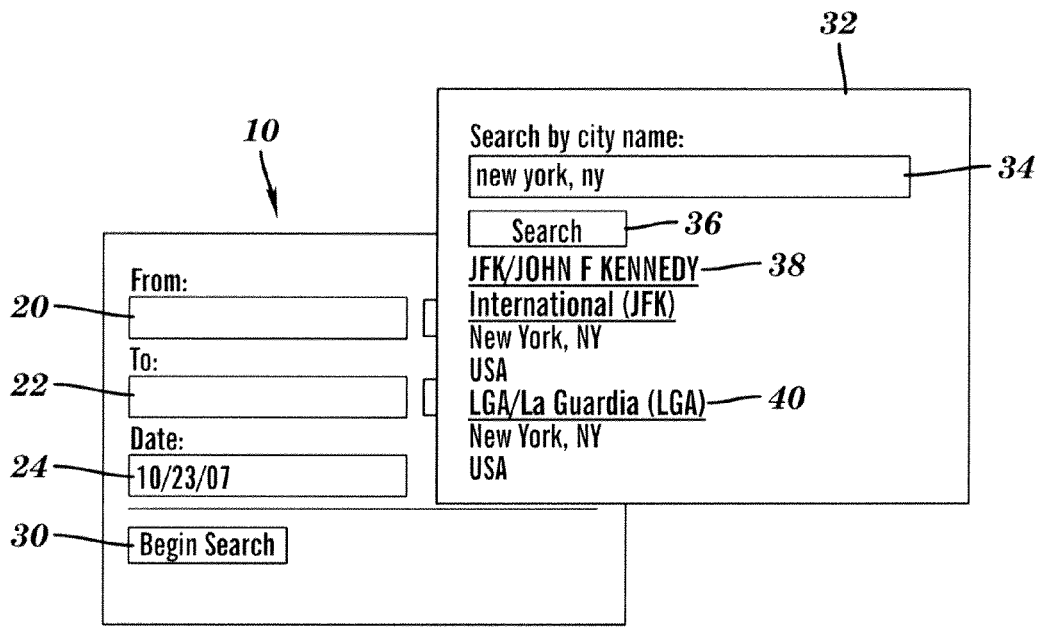
Figure 1D:
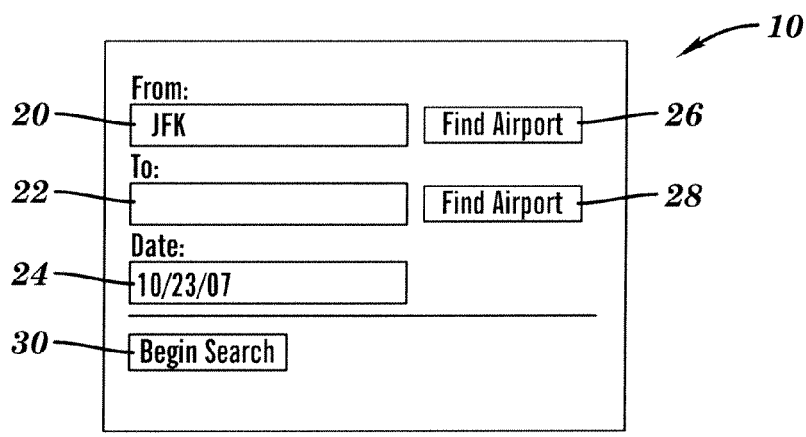
Figure 2:
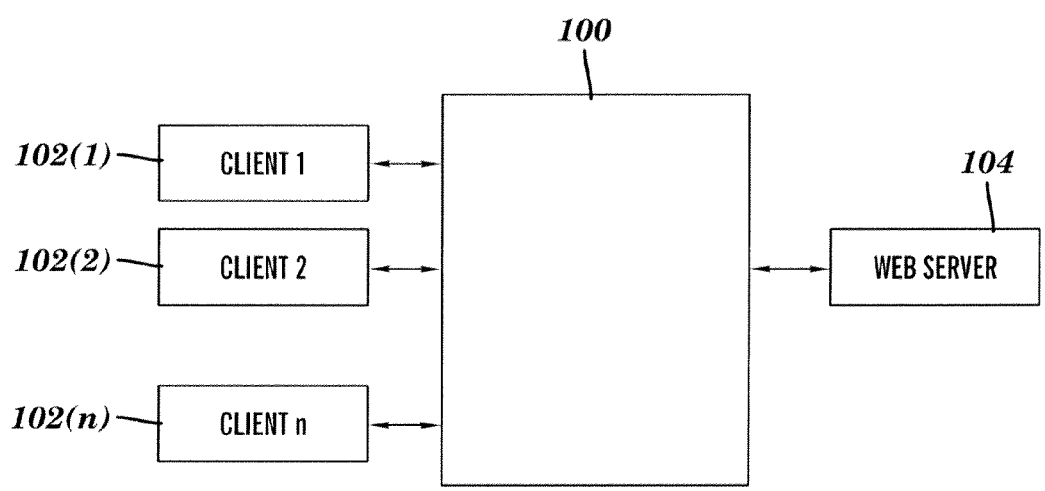
FIG. 2 is a block diagram of a system which optimizes web content in a device with a single display page environment in accordance with embodiments of the present invention.

A web content optimization system 100 in accordance with embodiments of the present invention is illustrated in FIG. 2. The web content optimization system 100 is coupled to one or more client systems 102(1)-102(n) and a web server system 104, although web content optimization system 100 could be connected to other types and numbers of servers, systems, devices, and components and in other manners. The present invention provides a number of advantages including providing web optimization systems and methods which enable the functionality of a popup window inside a web application to be executed in display environments which only permit viewing one page at a time.

Referring more specifically to FIG. 1, the web content optimization system 100 enables the functionality of a popup window inside a web application to be executed in display environments which only permit viewing one page at a time, although the web content optimization system 100 can provide other numbers and types of functions. Although one web content optimization system 100 is shown, other numbers and types of web content optimization systems can be used.

The web content optimization system 100 includes a central processing unit (CPU) or processor, a memory, and an interface system which are coupled together by a bus or other link, although other numbers and types of components, parts, devices, systems, and elements in other configurations and locations can be used. The processor in the web content optimization system 100 executes a program of stored instructions one or more aspects of the present invention as described and illustrated by way of the embodiments herein, although the processor could execute other numbers and types of programmed instructions.

The memory in the web content optimization system 100 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the web content optimization system 100.

The interface system in the web content optimization system 100 is used to operatively couple and communicate between the web content optimization system 100 and the client systems 102(1)-102(n) and the web server system 104 via the Internet, although other types and numbers of communication networks with other types and numbers of connections and configurations can be used.

Each of the client systems 102(1)-102(n) enables a user to access content and utilize one or more applications from the web server system 104 through the web content optimization system 100 through one or more communication networks, although one or more of the client systems 102(1)-102(n) could access content and utilize other types and numbers of applications from other sources and could provide a wide variety of other functions for the user. Although multiple client systems 102(1)-102(n) are shown, other numbers and types of user computing systems could be used. In this example, the client systems 102(1)-102(n) comprise mobile devices with Internet access that only permit a single web page to be displayed, although each of the client systems 102(1)-102(n) can comprise a wide variety of different types of devices and systems, such as smart phones, PDAs, or desktop computers or other systems configured to block popup windows.

Each of the client systems 102(1)-102(n) includes a central processing unit (CPU) or processor, a memory, user input device, a display with a single page display environment, and an interface system, and which are coupled together by a bus or other link, although one or more of the client systems can include other numbers and types of components, parts, devices, systems, and elements in other configurations. The processor in each of the client systems 102(1)-102(n) executes a program of stored instructions for one or more aspects of the present invention as described and illustrated herein, although the processor could execute other numbers and types of programmed instructions.

The memory in each of the client systems 102(1)-102(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in each of the client systems 102(1)-102(n).

The user input device in each of the client systems 102(1)-102(n) is used to input selections, such as requests for an application, although the user input device could be used to input other types of data and interact with other elements. The user input device can include a computer keyboard and a computer mouse, although other types and numbers of user input devices can be used. Input devices can include phone keypads, touch screens and voice inputs.

The display in each of the client systems 102(1)-102(n) is used to show data and information to the user, such as a travel booking web page by way of example only. The display in each of the client systems 102(1)-102(n) is a CRT or LCD screen which only permits a single page to be displayed at a time, although other types and numbers of displays could be used.

The interface system in each of the client systems 102(1)-102(n) is used to operatively couple and communicate between the client systems 102(1)-102(n) and the web content optimization system 100 and web server system 104 over the Internet, although other types and numbers of communication networks with other types and numbers of connections and configurations can be used.

The web server system 104 provides one or more web software applications for use by one or more of the client systems 102(1)-102(n), although the web server system 104 can provide other numbers and types of applications and/or content and can have provide other numbers and types of functions. Although one web server system 104 is shown, other numbers and types of web server systems can be used.

The web server system 104 includes a central processing unit (CPU) or processor, a memory, and an interface system which are coupled together by a bus or other link, although the web server system 104 could have other numbers and types of components, parts, devices, systems, and elements in other configurations and locations can be used. The processor in the web server system 104 executes a program of stored instructions one or more aspects of the present invention as described and illustrated by way of the embodiments herein, including managing application functionality, although the processor could execute other numbers and types of programmed instructions.

The memory in the web server system 104 stores these programmed instructions for one or more aspects of the present invention as described and illustrated by way of the embodiments herein including managing application functionality, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server system 104.

The interface system in the web server system 104 is used to operatively couple and communicate between the web server system 104 and the web content optimization system 100 and the client systems 102(1)-102(n) via the Internet, although other types and numbers of communication networks with other types and numbers of connections and configurations can be used.

Although embodiments of the web content optimization system 100, the client systems 102(1)-102(n), and the web server system 104, are described and illustrated herein, each of the client systems 102(1)-102(n), the web content optimization system 100, and the web server system 104, can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

By way of example only, the operation of the web content optimization system 100 to process and manage the use of an airline web application from the web server system 104 on a single page display environment on one of the client systems 102(1)-102(n) in accordance with embodiments of the present invention will now be described with reference to FIGS. 3A-6.

Figure 4:
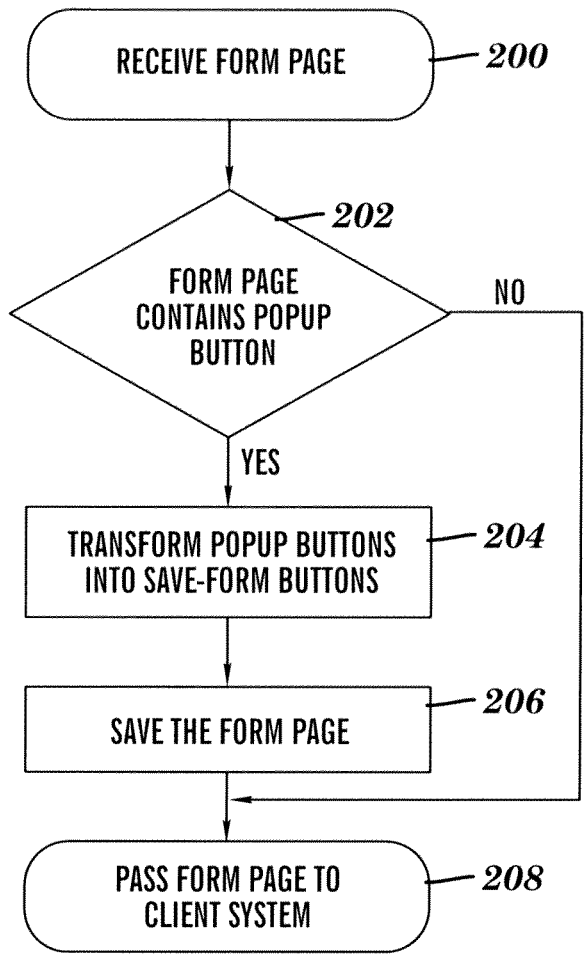
FIG. 4 is a flow chart of a method for processing a form page containing a popup window.

Referring to FIGS. 3A and 4, in this particular example one of the client systems 102(1)-102(n) enters a Hyper Text Transfer Protocol (HTTP) request that specifies a Uniform Resource Locator (URL) for an airline booking web page 100 which is transmitted over the Internet to the web server system 104 via the web content optimization system 110, although other types of requests, other manners for transmitting the request, and other types of web pages can be retrieved. In step 200, the web server system 104 receives the request and transmits the requested airline booking web page 110 to the web content optimization system 100.

In step 202, the web content optimization system 100 determines if the received airline booking web page 110 has any buttons or other activators for one or more popup windows. If the web content optimization system 100 determines the requested web page does not contain one or more popup buttons or other activators for one or more popup windows, then the No branch is taken to step 208. If the web content optimization system 100 determines the requested web page does contain one or more popup buttons or other activators for one or more popup windows, then the Yes branch is taken to step 204. In this particular example, the airline booking web page 110 has two "Find Airport" buttons 112 and 114 for popup windows to search for airport codes so the Yes branch is taken to step 204.

In step 204, the web content optimization system 100 converts the associated function of the popup buttons or other activators for one or more popup windows to buttons that activate the saving of the current web page along with any values entered by a user in one or fields of the current web page. These popup buttons are standard HTML (Hyper Text Markup Language) form submit buttons having the name attribute containing all the necessary information to substitute the current page with the desired popup page, although other types of popup buttons can be used and converted. In this particular example, the web content optimization system 100 converts the "Find Airport" buttons 112 and 114 from trying to retrieve and displaying a popup window to search for an airport code to buttons that activate the saving of the current airline booking web page 110 along with any values entered by a user in one or fields. Additionally, the buttons 112 and 114 are revised to activate retrieving and replacing the airline booking web page 110 with a page which has the popup window for searching for an airport code.

In step 206, the web content optimization system 100 saves the revised web page with the revised button or buttons. In this particular example, the web content optimization system 100 saves the revised airline booking webpage 110 with the converted "Find Airport" buttons 112 and 114.

By way of example only, a formal definition of the name attribute and two HTML fragments corresponding to two "Find Airport" save-form buttons is illustrated below:

```
<name_attribute> ::=
un_jtt_save_form/<redirect_url><form_name>
<field1_to_fill>...<fieldn_to_fill>
<input value="Find Airport"
name="un_jtt_save_form/http%3A%2F%www.acme.-
com%2Ffindairport.jsp+for m1+from" type="submit" />
<input value="Find Airport"
name="un_jtt_save_form/http%3A%2F%www.acme.-
com%2Ffindairport.jsp+for m1+to" type="submit" />
```

The attribute name contains all the necessary information to open the popup window correctly including: (1) the popup window page URL to redirect to after saving the form web page; (2) the name or index of the form web page; and (3) the list of fields in the form web page to be filled when a popup window is "clicked on" or otherwise activated.

In step 208, the revised form web page is transmitted to the display with the single web page display environment of the originally requesting one of the client system 102(1)-102(n). In this particular example, the revised airline booking web page 110 is displayed which includes the revised buttons 112 and 114 and also includes a "From" field 118, a "To" field 120, and a "Date" field 122 in which values can be entered by the user, although the displayed page can have other numbers and types of fields, buttons, and other content, depending on the particular application.

Figure 5:
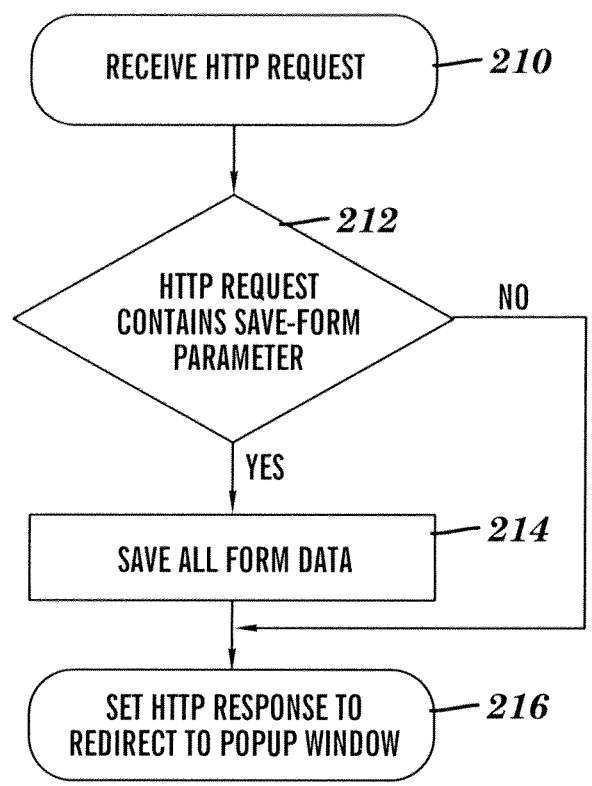
FIG. 5 is a flow chart of a method for handling a request for a popup window.

Referring to FIGS. 3B and 5, in step 210 if a user at the originally requesting one of the client systems 102(1)-102(n) needs additional information to complete one of the fields, then the user can press one of the revised buttons 112 or 114 which transmits a request for an associated popup window to the web content optimization system 100. In this particular example, if the user at one of the client systems 102(1)-102(n) does not know the code of the departure airport for the "From" field 118, then the user can press the corresponding "Find Airport" button 26 which transmits a request for the associated popup window to the web content optimization system 100.

In step 212, the web content optimization system 100 determines if the request for the popup window is associated with a revised web page that has new functionality associated with the activation of the button. If the request for the popup window is not associated with a revised web page that has new functionality associated with the activation of the button, then the No branch is taken to step 216. If the request for the popup window is associated with a revised web page that has new functionality associated with the activation of the button, then the Yes branch is taken to step 214. In this particular example, when the "Find Airport" button 26 is pressed, the request for the popup window is associated with a revised airline booking web page 110 that has new functionality associated with the activation of the button so the Yes branch is taken to step 214.

In step 214, the web content optimization system 110 saves the form web page along with any values entered in fields by a user, although other types and amounts of information can be saved in other manners. In this particular example, the airline booking web page 110 along with the value "10/23/07" entered by the user in the "Date" field 122 is saved, although other types and amounts of information can be saved.

In step 216, the web content optimization system 100 retrieves the requested popup window from the web server system 104 and transmits the popup window to the requesting one of the user client systems 102(1)-102(n). The requesting one of the user client systems 102(1)-102(n) only displays the new popup window in the screen of the display. In this particular example, the popup window 130 to assist with a search of an airport code is only shown on the display in the requesting one of the user client systems 102(1)-102(n) as illustrated in FIG. 3B. Accordingly, this enables a device with a single page display environment, such as the requesting one of the user client systems 102(1)-102(n), to access and utilize the functionality of a popup window which previously was not possible.

Figure 6:
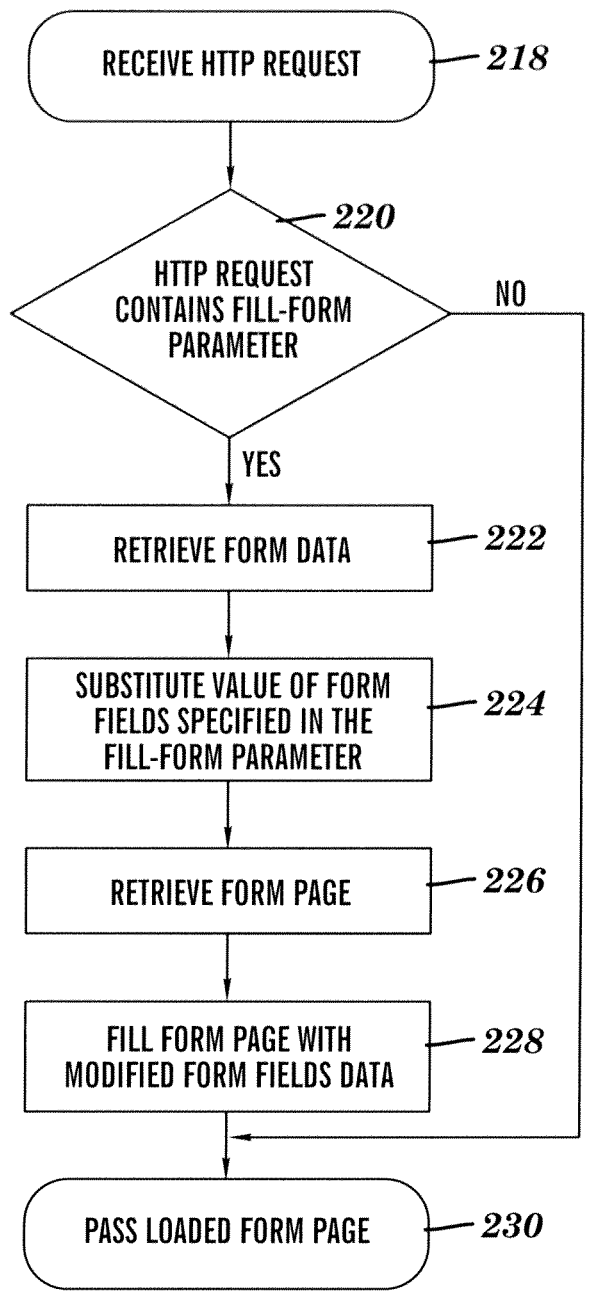
FIG. 6 is a flow chart of a method filling a form page with values obtained with a popup window.

Referring to FIGS. 3C, 3D, and 6, in step 218 a user at one of the user client systems 102(1)-102(n) enters a value in a search field and activates an associated "Search" button which transmits the request to the web content optimization system 100. In this particular example, the user at one of the user client systems 102(1)-102(n) enters, "New York, N.Y." in the search field 132 and hits a "Search" button 134 to transmit the request for the closest airport code or codes to the web content optimization system 100. The web content optimization system 100 transmits the request to the web server system 104 which processes the request. The web server system 104 transmits the results to the web content optimization system 100 which converts the results into one or more fill form links which can be activated to fill a field in the form web page. Next, the web content optimization system 100 inserts the converted results into the popup window 130 on display at the requesting one of the user client systems 102(1)-102(n). In this particular example, in response to the entry of "New York, N.Y." in the search field 132, the results "JFK/ John F. Kennedy International Airport (JFK) and "LGA/LaGuardia (LGA)" are received, converted to fill form links, and inserted for display in popup window 130 as illustrated in FIG. 3C.

By way of example only, an HTML fragment corresponding to a fill-form link to fill the "From" field 118 in this example is illustrated below:
<a href="/mt/cache/?un_jtt_fill_param=JFK">JFK/John F Kennedy International (JFK)</a>

The link contains an un_jtt_fill_param parameter whose value will be used to fill the "From" field 118 in this example. The number of un_jtt_fill_param parameters must correspond to the number of form fields previously indicated in the save-form button. The fill-form link does not contain any data referring to the form page.

In step 218 a user at one of the user client systems 102(1)-102(n) selects a result link and transmits the request for receipt by the web content optimization system 100. In this particular example, the user at one of the user client systems 102(1)-102(n) selects "JFK/John F Kennedy International (JFK)" to transmit the request which is received by the web content optimization system 100

In step 220, the web content optimization system 100 determines if the request is selecting a fill form link for filling a value in field in the form web page. If the web content optimization system 100 determines the request is not selecting a value for filling a field in the airline booking web page 110, then the No branch is taken to step 230. If the web content optimization system 100 determines the request is selecting a value for filling a field in the airline booking web page 110, then the Yes branch is taken to step 222.

In step 222, the web content optimization system 100 retrieves the previously saved form data. In this particular example, the web content optimization system 100 retrieves the previously entered value for the "date" field 122, the other field values are empty.

In step 224, the web content optimization system 100 retrieves the selected value for the corresponding entry field. In this particular example, the web content optimization system 100 retrieves "JFK" for the "From" field 118.

In step 226, the web content optimization system 100 retrieves the saved web form page. In this particular example, the web content optimization system 100 retrieves the airlines booking page 110.

In step 228, the web content optimization system 110 merges retrieved and modified data of steps 222 and 224 with the previously saved form page of step 226. The requesting one of the user client systems 102(1)-102(n) displays the resulting page in the screen of the display. In this particular example, the web content optimization system 100 inserts "JFK" value into the From field 118 and "10/23/07" into the Date field 122 of the retrieved airlines booking page 110.

In step 230, the form web page with the stored and selected values is loaded on and shown on the display of the requesting one of the user client systems 102(1)-102(n), although the page can be identified, retrieved, and loaded in other manners. In this particular example, a previously entered date "10/23/

07" is entered in the "Date" field 122 and the selected airport code, "JFK" is entered in the "From" field 118 in the airline booking web page 110 which is shown on the display of the requesting one of the user client systems 102(1)-102(n) as illustrated in FIG. 3D.

Accordingly, as described and illustrated herein the present invention provides web optimization systems and methods which enable the functionality of a popup window inside a web application to be executed in display environments which only permit viewing one page at a time.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for web content optimization, the method comprising;
    automatically determining with a web content optimization device in response to an initial request from a client device when a requested web page has an activator for a popup window for at least one of one or more form fields in the requested web page before the requested web page is provided to the client device;
    automatically converting with the web content optimization device the activator for the popup window for at least one of one or more form fields in the requested web page to have another functionality from requesting the popup window before the requested web page is provided to the client device;
    providing with the web content optimization device the converted web page in response to the initial request;
    determining with the web content optimization device when a subsequent request for the popup window as a result of an engagement of the activator in the converted web page is received; and
    retrieving and providing with the web content optimization device the requested popup window as another web page in response to the subsequent request.

2. The method as set forth in claim 1 further comprising saving with the web content optimization the converted web page prior to the providing the converted web page in response to the initial request.

3. The method as set forth in claim 1 further comprising saving with the web content optimization device the converted web page with any values entered in the one or more form fields of the converted web page when the subsequent request for the popup window is received.

4. The method as set forth in claim 3 further comprising:
    obtaining with the web content optimization device one or more resulting values in response to another received request with at least one value in at least one of one or more form fields in the another web page for the requested popup window;
    converting with the web content optimization device the one or more resulting values into one or more form fill links;
    inserting with the web content optimization device the one or more results into one or more form fill links in the corresponding one of one or more form fields in the another web page for the requested popup window; and
    providing in response to the another received request with the web content optimization device the another web page for the requested popup window with the inserted one or more form fill links.

5. The method as set forth in claim 4 further comprising:
    determining with the web content optimization device when a different received request is selecting one of the form fill links;
    retrieving with the web content optimization device the resulting value associated with the selected one of the form fill links and the saved converted web page with any values entered in the one form fields when the different received request is determined to have the selection of one of the form fill links;
    merging with the web content optimization device the retrieved resulting value for the selected one of the form fill links with the saved converted web page with any values into a merged web page; and
    providing with the web content optimization device the merged web page.

6. A non-transitory computer readable medium having stored thereon instructions for web content optimization comprising machine executable code which when executed by at least one processor, causes the processor to perform steps comprising:
    automatically determining in response to an initial request from a client device when a requested web page has an activator for a popup window for at least one of one or more form fields in the requested web page before the requested web page is provided to the client device;
    automatically converting the activator for the popup window for at least one of one or more form fields in the web page to have another functionality from requesting the popup window before the requested web page is provided to the client device;
    determining when a subsequent request for the popup window as a result of an engagement of the activator in the converted web page is received; and
    retrieving and providing the requested popup window as another web page in response to the subsequent request.

7. The medium as set forth in claim 6 further comprising saving with the web content optimization the converted web page prior to the providing the converted web page in response to the initial request.

8. The medium as set forth in claim 6 further comprising saving the converted web page with any-values entered in the one or more form fields of the converted web page when the subsequent request for the popup window is received.

9. The medium as set forth in claim 8 further comprising:
    obtaining one or more resulting values in response to another received request with at least one value in at least one of one or more form fields in the another web page for the requested popup window;
    converting the one or more resulting values into one or more form fill links;
    inserting the one or more results into one or more form fill links in the corresponding one of one or more form fields in the another web page for the requested popup window; and
    providing in response to the another received request the another web page for the requested popup window with the inserted one or more form fill links 10. The medium as set forth in claim 9 further comprising:
determining when a different received request is selecting one of the form fill links;
retrieving the resulting value associated with the selected one of the form fill links and the saved converted web page with any values entered in the one form fields when the different received request is determined to have the selection of one of the form fill links;
merging the retrieved resulting value for the selected one of the form fill links with the saved converted web page with any values into a merged web page; and
providing the merged web page.

11. A web content optimization apparatus comprising:
one or more processors;
a memory coupled to the one or more processors, the one or more processors configured to execute programmed instructions stored in the memory comprising:
automatically determining in response to an initial request from a client device when a requested web page has an activator for a popup window for at least one of one or more form fields in the requested web page before the requested web page is provided to the client device;
automatically converting the activator for the popup window for at least one of one or more form fields in the web page to have another functionality from requesting the popup window before the requested web page is provided to the client device;
determining when a subsequent request for the popup window as a result of an engagement of the activator in the converted web page is received; and
retrieving and providing the requested popup window as another web page in response to the subsequent request.

12. The apparatus as set forth in claim 11 wherein the one or more processors is further configured to execute programmed instructions stored in the memory for further comprising saving with the web content optimization the converted web page prior to the providing the converted web page in response to the initial request.

13. The apparatus as set forth in claim 11 wherein the one or more processors is further configured to execute programmed instructions stored in the memory for further comprising saving the converted web page with any-values entered in the one or more form fields of the converted web page when the subsequent request for the popup window is received.

14. The apparatus as set forth in claim 13 wherein the one or more processors is further configured to execute programmed instructions stored in the memory for further comprising:
obtaining one or more resulting values in response to another received request with at least one value in at least one of one or more form fields in the another web page for the requested popup window;
converting the one or more resulting values into one or more form fill links;
inserting the one or more results into one or more form fill links in the corresponding one of one or more form fields in the another web page for the requested popup window; and
providing in response to the another received request the another web page for the requested popup window with the inserted one or more form fill links.

15. The apparatus as set forth in claim 12 wherein the one or more processors is further configured to execute programmed instructions stored in the memory for further comprising:
determining when a different received request is selecting one of the form fill links;
retrieving the resulting value associated with the selected one of the form fill links and the saved converted web page with any values entered in the one form fields when the different received request is determined to have the selection of one of the form fill links;
merging the retrieved resulting value for the selected one of the form fill links with the saved converted web page with any values into a merged web page; and
providing the merged web page.

\* \* \* \* \*